(12) United States Patent
Hoeft (10) Patent No.: US 7,171,341 B2
(45) Date of Patent: Jan. 30, 2007

(54) COMPUTER-ASSISTED-DESIGN OF PIPING SWING-JOINT INTERSECTIONS

(76) Inventor: David Henry Hoeft, 6053 S. Quebec St., Suite 100, Englewood, CO (US) 80111

( * ) Notice: Subject to any disclaimer, the term of this patent is extended or adjusted under 35 U.S.C. 154(b) by 725 days.

(21) Appl. No.: 09/964,135

(22) Filed: Sep. 27, 2001

(65) Prior Publication Data

US 2003/0061011 A1    Mar. 27, 2003

(51) Int. Cl.
 *G06F 17/50*    (2006.01)
(52) U.S. Cl. ............................. 703/1; 703/7
(58) Field of Classification Search .................. 703/1, 703/7; 706/920, 919
See application file for complete search history.

(56) References Cited

U.S. PATENT DOCUMENTS

| | | | |
|---|---|---|---|
| 5,227,983 | A | 7/1993 | Cox et al. |
| 5,557,537 | A | 9/1996 | Normann et al. |
| 5,808,905 | A | 9/1998 | Normann et al. |
| 6,567,772 | B1 * | 5/2003 | Hoeft ............................. 703/1 |
| 2003/0167155 | A1 | 9/2003 | Reghetti |
| 2004/0080407 | A1 | 4/2004 | Reghetti |
| 2004/0080408 | A1 | 4/2004 | Reghetti |
| 2004/0080409 | A1 | 4/2004 | Reghetti |
| 2004/0080520 | A1 | 4/2004 | Reghetti |
| 2004/0083080 | A1 | 4/2004 | Reghetti |
| 2004/0083081 | A1 | 4/2004 | Reghetti |

OTHER PUBLICATIONS

Software Engineering, Inc.; Clients; retrieved on May 16, 2005 from http://www.softwareengineering.com/clients.htm; 2 pages.*
USPTO Trademark Search System; search for "autosprink" and status report; retrieved on May 16, 2005 from www.uspto.gov; 5 pages.*
AutoSPRINK(r) online help, "Auto Draw Menu", 14 pages.*
AutoSPRINK(r) online help, "Commands Menu", 22 pages.*
AutoSPRINK(r) online help, "Welcome to AutoSPRINK VR4", 6 pages.*
"Sprinkler design CAD package", archive of alt.engineering.fire-protection Usnet news group, retrieved from http://groups.google.com on Feb. 3, 2006.*
M.E.P.CAD "AlarmCAD Getting Started" Copyright 2000.
M.E.P.CAD "The AutoSPRINK Production System" Copyright 2002.

(Continued)

*Primary Examiner*—Paul Rodriguez
*Assistant Examiner*—Jason Proctor
(74) *Attorney, Agent, or Firm*—Bell, Boyd & Lloyd LLC (57) ABSTRACT

A design assistance method and apparatus is provided for creating swing joint layout objects for interconnection among layout objects for use in a computer assisted design apparatus, the apparatus including an input means, a display device, a storage and a processor connected to the input means, the display including image data representative of layout objects and the storage including layout object data and layout object image data.

9 Claims, 11 Drawing Sheets

OTHER PUBLICATIONS

M.E.P.CAD "Alarm CAD Product Brochure" Copyright 2002.

M.E.P.CAD "AutoSPRINK Alarm version 1.0.42.738" Aug. 27, 2001, CD Media.

M.E.P.CAD "AutoALARM Help File from AutoSPRINK Alarm version 1.0.42.738" Copyright 2001. As printed May 2004.

M.E.P.CAD "AutoALARM v. 1.0.25.700" Oct. 2000, CD Media.

M.E.P.CAD "AutoSPRINK Help File from AutoALARM v.1.0.24. 700." Copyright 2000. As printed May 2004.

M.E.P.CAD "AlarmCAD v.1.0.63.Beta" Copyright 2002, CD Media.

M.E.P.CAD "AlarmCAD Help File From AutoCAD v.1.0.63.787." Copyright 2002. As printed May 2004.

"*NACTool Electronic Circuit Builder Operating Instructions*", Rev. 2.63, Wheelock, Inc., Aug. 1997, pp. 1-5.

"*MicroStation*", Bentley Ssytems, Inc., Jan. 2003, pp. 1-2.

"*AutoCAD 2005: Features and Benefits*", Autodesk, Inc, 2004, pp. 1-9.

"*Wheelock, Inc. Design Software*" Wheelock, Inc. Website [retrieved on Jun. 25, 2004] Retrieved from <URL: http://www.wheelockinc.com/technical_support/software.htm>, 1 page.

"*Arris Learning Guide*", Version 8.1., Sigma Design, LLC., Mar. 23, 2004, pp. 1-62.

"*Arris New User Tutorial*", Version 8.1., Sigma Design, LLC., Jun. 9, 2004, pp. 1-67.

"*Fire-Lite Alarms*" Fire-Lite Alarms, Inc. Website [retrieved on Jun. 25, 2004] Retrieved from <URL: http://www.firelite.com/aboutus.html>, 1 page.

\* cited by examiner

COMPUTER-ASSISTED-DESIGN OF PIPING SWING-JOINT INTERSECTIONS

CROSS REFERENCE TO RELATED APPLICATIONS

Not Applicable.

BACKGROUND OF THE INVENTION

1. Field of the Invention

The present invention relates to a method and apparatus for computer-assisted-design ("CAD") of piping systems. In particular, the invention relates to a CAD method and apparatus suitable for creating swing-joint intersections between sections of piping in a three-dimensional drawing.

2. Description of the Related Art

The design of a layout area consisting of layout piping objects, such as water delivery pipes for use in a fire sprinkler system, requires the interconnection of the pipes arranged in three dimensional space. When two pipes must interconnect it is desirable to design the layout so that the connections may be formed at 90° angles rather than bends. This design enables the pipes to be assembled, in an actual construction, using standard "elbow" fittings which typically include a 90° change in direction. By using two 90° degree changes of direction, a pipe can jog-over to interconnect with another pipe. This connection is a "swing-joint".

In conventional systems for the CAD layout of piping systems, swing-joints are manually determined by the designer while he/she watches the design drawings and data. The decision as to which layout objects should be relocated, in what sequence, and by what amount of movement is left to the operator. As a result, it takes a great deal of the designer's time and effort to create swing-joint intersections in the design layout. Swing-joint intersections are particularly difficult to calculate manually because pipe layout object segments must be modified to arrive at that point, in three dimensional space, where the pipes can be interconnected with elbow fittings. Moreover, after modification of the pipe layout object segments, it is time consuming to consolidate the modified arrangement of segments into a design layout which is efficient for application in an actual construction.

Computer assisted design systems which automate some of the decision making processes are also well known. For example, Mitsuta, et al., U.S. Pat. No. 4,831,546, discloses a design system for routing piping (in the layout planning of building installations a method of optimally determining the optimal piping route relative to interfering objects by entering data of installation layout, layout objects, and data of design reference) and, Yoshida et al., U.S. Pat. No. 4,992,953, discloses a computer assisted design method and apparatus for finding and displaying a graphic pattern of a liquid stay area (layout object data relating to the layout object specified by an input device and a liquid discharger arrangement rule). However, with these design systems, changes in direction are simply located where the piping bends to overcome the interfering or arranged objects in the design layout.

Thus, what is needed is a method and apparatus which is suitable for creating swing-joint intersections between sections of piping in a three-dimensional CAD drawing. There also exists a need for a system which enables the designer to rapidly create swing-joint intersections, in a three dimensional CAD piping design layout, among user specified layout objects depicted in the design display. A further need exists for an automated method and apparatus which is useful to mathematically determine the optimal locations for turning the piping in order to create the swing-joint intersections in three dimensional space and to modify and consolidate the piping layout object segments for use in an actual construction. The disclosed invention satisfies these needs.

SUMMARY OF THE INVENTION

A primary object of this invention is to provide a method and apparatus for assisting layout design which readily pinpoints locations for the creation of swing-joint layout objects for intersection among a plurality of layout objects.

It is another object of the present invention to provide a design assistance method and apparatus which is useful to rapidly create swing-joint intersections among specified piping and fitting layout objects depicted on a display device.

It is yet another object of the present invention to provide a design assistance method and apparatus which can precisely create swing-joint intersections among a plurality of design objects for assembly in an actual construction using 90° elbow fittings.

It is a further object of the invention to provide a design assistance method and apparatus which can precisely consolidate design layout objects, representative of pipes and fittings, after modification the design to include swing-joint layout objects.

These and other objects of the present invention will become apparent throughout the description of the invention which now follows.

Briefly, the invention provides a design assistance method for creating swing joint layout objects for interconnection among layout objects for use in a computer assisted design apparatus, the apparatus including an input means, a display device, a storage and a processor connected to the input means, the display including image data representative of layout objects and the storage including layout object data and layout object image data, which includes the steps of: retrieving layout object data of layout objects specified by the input means and image data graphically representing the specified pipe layout objects from the storage; collecting layout object data of the layout objects and the specified layout objects; retrieving design reference data which establishes a maximum jog-over distance, finding a first end of a source pipe layout object wherein the first end is not terminating in a layout object using the layout object data and the specified layout object data; finding a target pipe layout object end having a least distance within the maximum jog-over distance relative to the first end using the specified layout object data and the maximum jog-over distance; generating at least one swing-joint layout object interconnecting the first end and the target pipe layout object end; storing layout object data representing the swing joint layout object and adding the stored layout object data to the collection; and displaying image data representing the layout object data of the collection.

Unless specifically defined otherwise, all technical or scientific terms used herein have the same meaning as commonly understood by one of ordinary skill in the art to which this invention belongs. Although any methods and materials similar or equivalent to those described herein can be used in the practice or testing of the present invention, the preferred methods and materials are now described.

"Layout objects" means pipe and fitting elements in an object data oriented computer-aided-design which are representative of actual pipes and fittings. Pipes objects exist in the drawing as segments and the segments are interconnected using layout objects which represent actual pipe fittings.

"Swing-joint" means pipe ends interconnected using flange, screw, bell and spigot, weld, or solder, at 90° or 45°, turned up, or turned down, and further include pipe ends interconnected at 180° using a joint fitting.

"Jog-Over" means the maximum distance condition that two pipes may be laterally separated for interconnection by a swing-joint layout object.

"Swing distance" is the distance between two separated pipes for interconnection using a swing-joint.

DESCRIPTION OF THE DRAWINGS

The present invention is illustrated by way of example and not limitation in the accompanying figures in which like reference numerals indicate similar elements and in which.

DETAILED DESCRIPTION OF THE INVENTION

The computer architecture and associated hardware for designing swing-joint interconnections in a CAD system of piping is well known, and many suitable computer and hardware combinations may be programmed to complete the system according to the present invention. Typical examples of the computer architecture and hardware are described in the foregoing patents which are incorporated by reference herein.

Figure 1:
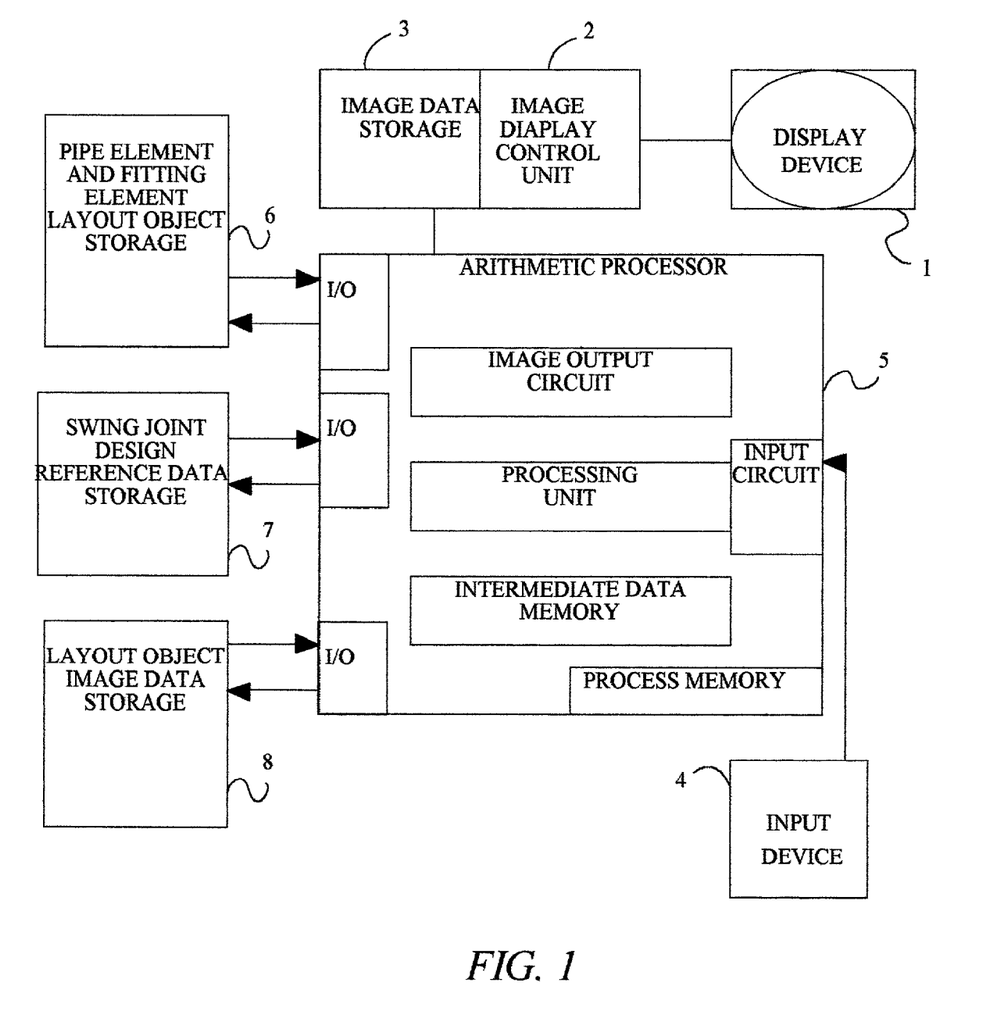
FIG. 1 is a block diagram of the layout design assisting system embodying the present invention.

Turning now to the drawing figures wherein like numerals represent like elements there is shown in FIG. 1 a block diagram of the layout design assisting system embodying the present invention. The layout design assisting system includes a display device 1, a graphic display controller 2, a graphic data memory 3, an input device such as a keyboard and mouse pointer 4, an arithmetic processing unit 5, piping layout object data memory 6, a swing-joint design reference data memory 7, including a maximum jog-over distance and a swing distance, and a layout area graphic data memory 8. The arithmetic processing unit 5 consists of a arithmetic operator, an operation sequence memory, an input port, a graphic data input port, a design object graphic data search signal output port, and a design reference data search signal output port. Graphic data, to be displayed, is produced in the arithmetic processing unit and stored in the graphic image data memory.

The graphic display controller 2 retrieves graphic data from the graphic data memory 3 and displays it on the display unit 1. The object data memory 6 stores data related to layout objects (pipe and fitting elements). Stored layout object data includes data of a specified pipe elements for swing-joint interconnection. Layout object data for piping includes the pipe diameter and coordinates (x, y, z) of the pipe ends, and the location for each pipe layout object in the drawing display 1. Layout object data may, but need not, also include functional data representative a layout objects function in the design. The design reference data memory 7 stores design reference data which includes a maximum jog-over distance specified by the user through the keyboard input device 4.

The present invention is implemented in a CAD program structure of a computer. The logical concept for describing components of the computer program are known as objects. An object is used to define the properties and interfaces of a system component. The computer program is an assembly of one or more objects. This object structure helps to clearly define and encapsulate the components of the computer program. The program uses "Object Oriented Programming", an industry standard practice, well know in the art, for program definition, design, and development. The objects herein, are implemented in C++ program code as classes. A class is a C++ programming language data structure that exists to implement the logical concept of an object. A class is used to encapsulate the data/properties and methods/interfaces of an object into a single data structure.

Three basic foundation structure programs are initially stored into the computer memory to implement the design of swing-joint intersections among pipe layout objects for display in the drawing according to the present invention. First, Microsoft Foundation Program Structure is a program based upon the Microsoft standard Multi-Document Interface (MDI). This program model is built upon a base consisting of four fundamental objects: Application, Frame, Document, and View. The Application, sold under the trademark, MICROSOFT FOUNDATION CLASS LIBRARIES (MFC), provides these utilitarian objects and represents a program itself. It is through the Application object that the process is initiated and all other objects that comprise the invention come into existence. The application creates the Frame, Document, and View objects. The Frame object represents the frame window of the Application that becomes visible to the user and acts as the manager for subsequent user interface objects, such as other windows. The Frame object encapsulates the internal data structures used by the operating system, sold under the trademark MICROSOFT WINDOWS®, to create and maintain an application's parent window. The Document object represents an instance of the user's data and is stored to disk for later retrieval. Many Document objects can exist for each instance of the program, enabling the program to open several documents simultaneously. The View object represents a view into the data of a Document object. The View object provides the user with a visual interface to the Document. The View object encapsulates the internal data structures used by the MICROSOFT WINDOWS® operating system to create and maintain an application's child window. Many View objects can exist for each Document object, enabling the program to display several different views of the same document simultaneously.

The second foundation program is a CAD foundation sold under the trademark SYMMETRICA® for the piping system design software. This software comprises a set of programming objects that expands upon the MFC program structure. It adds capability to the MFC Application, Frame, Document, and View objects, enabling them to offer the fundamental behavior and interfaces of a CAD program. Many essential objects provided by this program support the needs of a CAD program. Derived from MICROSOFT MFC Objects, are an Application object necessary to support the CAD program, and a Frame object which establishes the parent window framework required to support the CAD program objects. A Document object is used to provide all the capability required to encapsulate CAD drawing data, which includes drawing elements and user settings appropriate to each drawing. A View object provides a visual interface to the document object. This View object provides the three dimensions view rotation and scaling properties, enabling the user to view the document's data from any arbitrary three dimension, view rotation, and magnification. It also provides for requesting three dimensional Cartesian coordinate (x, y, z) point input from the user. Input is provided by the system pointing device (mouse), the keyboard, or both. Also provided is a base class object of all CAD drawing elements, such as lines, arcs, circles, etc., that can be managed by the Document object and displayed by the View object. This object defines the interface to the CAD drawing elements that all derived classes inherit through standard C++ mechanisms. This standard interface enables the definition of the new kinds of elements for the CAD drawing, such as a pipe layout object derived from a line segment. The CAD foundation program further acts as the foundation program for the piping swing-joint interconnection design program.

The third foundation program is the program sold under the trademark OBJECT DBX®. This program is a collection of objects for reading, writing, and viewing DWG and DXF drawing files. This file format is well known in the art, the industry standard for the exchange of drawing files, and is used in the preferred embodiment of the invention. Using OBJECT DBX® objects, the above CAD foundation has the capability to read, write, and view DWG and DXF drawing files. This capability has been implemented in the CAD program Document and View objects. DWG and DXF drawing files can be read/appended to a CAD drawing, of the above program, and the CAD drawings may be stored on a data storage medium as DWG and DXF drawing files. Additionally, DWG and DXF drawing files can be selected as a backdrop to the current CAD drawing. This method enables the CAD program to make full use of the programs high-speed display objects to view DWG and DXF drawings. When the display must be refreshed, the background drawing is displayed first, immediately followed by the elements of the CAD drawing.

Figure 9:
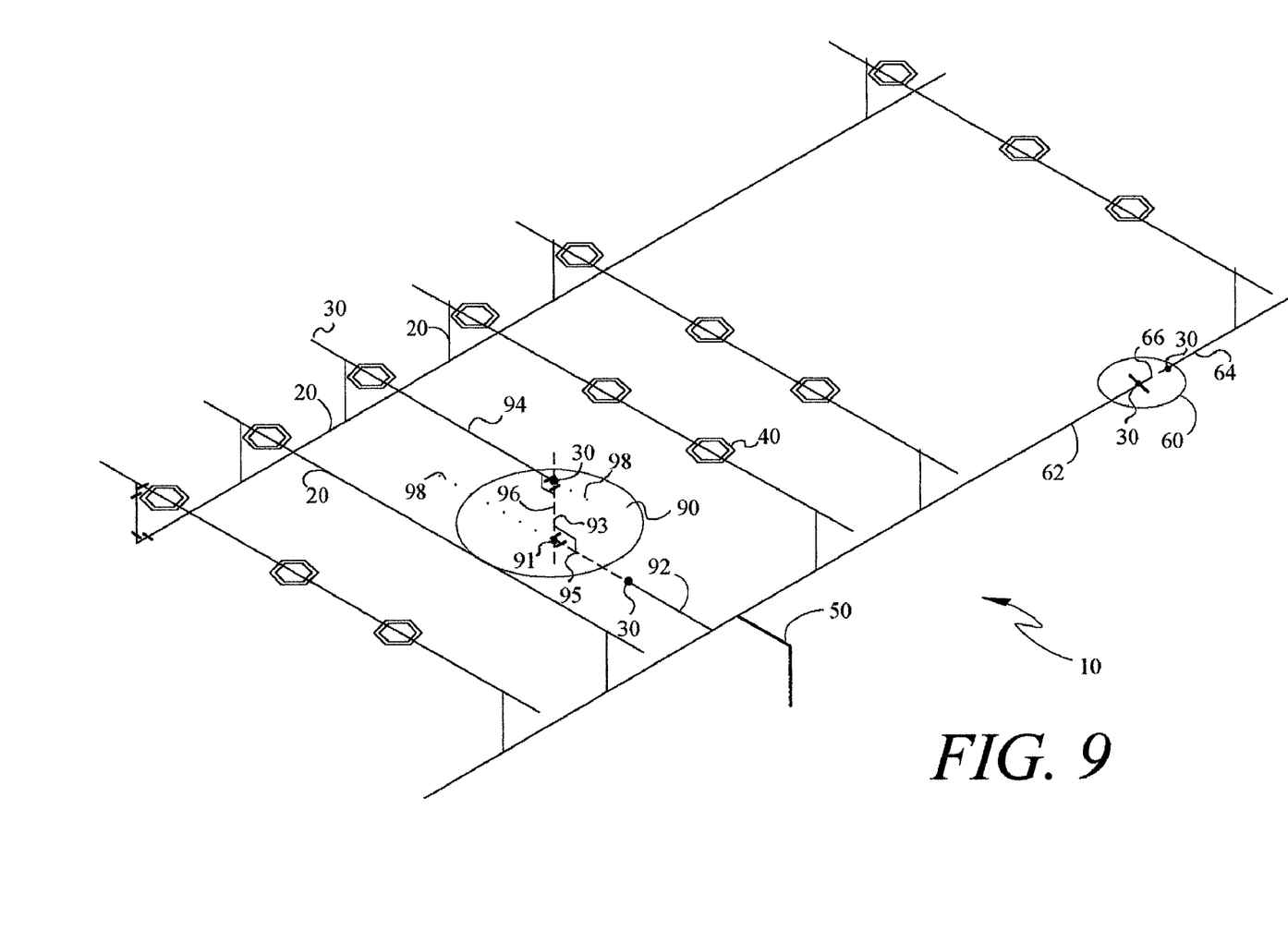
FIG. 9 is a diagram showing an example of a display on the display unit of a sprinkler system pipe layout design in a case where the source and target pipes for swing-joint interconnection exists in a parallel relationship (90) and where the pipes are in a parallel and collinear relationship (60).

Turning now to the drawing figures there is shown in FIG. 9, a diagram showing an illustration of a display on the display unit of a sprinkler system pipe layout design 10 in a case where the source and target pipes for swing-joint interconnection exist in a parallel relationship (90) and where the pipes are in a parallel and collinear relationship (60). The layout drawing may be created by storing in a first memory means a drawing view 10 of a piping system, the drawing comprised of a plurality of changeable interengageable pipe layout objects, such as water delivery pipes 20 for a fire sprinkler system, representational of an actual construction, for selective assembly together. The elements have distinctive properties that enable the three-dimensional pipe diameter and the coordinates (x, y, z) for location of each pipe end 30 for each pipe layout object 20 in the drawing. The drawing is displayed on the display device 1. Optimally, for each pipe layout object 20 the display further exposes a property dialog window for identification of each pipe layout object's 20 application in a system of piping, e.g., whether the pipe is a branch line, Cross Main, Riser Nipple, Arm Over, Sprig. Drop, etc.

Figure 2:
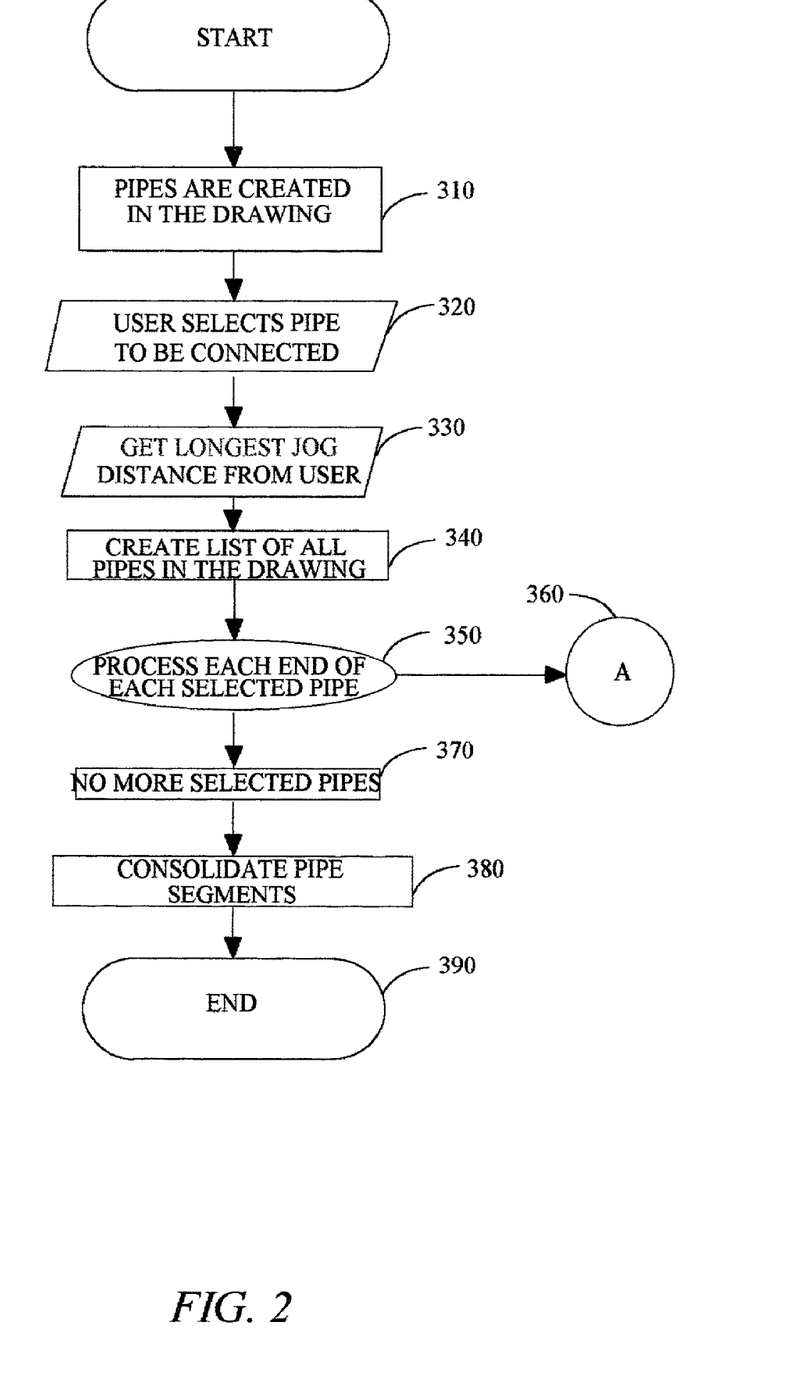
FIGS. 2–8 are a flow charts explaining the operational sequence of the layout design assisting system shown in FIG. 1.

Referring now to FIG. 2, after creating 310 and displaying the drawing view 10, having a new layout of pipe layout objects or by loading an existing layout of pipe layout objects, the designer selects two or more pipe layout objects ("specified layout objects") 320 for swing-joint interconnection using the input device 4, such as a mouse pointer, keyboard or digitizer. For example, with reference to again FIG. 9, the designer would select pipe layout objects 62, 64, 92, and 94 for swing-joint interconnection.

The designer then retrieves or inputs design reference data which defines a maximum jog-over distance 330 for the swing-joint connections. The longest jog-over distance condition provides control over the creation of swing-joints between pipe layout objects in the drawing.

The computer then compiles a collection 340, or list, of all pipe and fitting layout objects already existing in the drawing of the system (the "existing layout objects" herein). In one embodiment of the invention, auxiliary pipe layout objects may, but need not, be selectively removed from the collection based upon their function in the system. For example, pipe layout objects which are assigned, through their respective properties dialog windows, to be a Riser Nipple, Arm Over, Sprig, or Drop would be removed from the collection 340. This enables swing-joints (at 90 and 60 in FIG. 10) to be created between pipes 20 that often terminate in an auxiliary pipe. The following logic prevents the creation of a swing-joint at such pipes had they not been removed from the collection.

Each end 30 of each specified pipe is examined 3 50, in turn, to find a suitable target pipe, among the specified layout objects, at which to create a swing-joint. If a suitable target pipe is found, a swing-joint is created. As each specified pipe end is processed 350, this description refers to the specified pipe whose end is being processed, relative to a candidate target pipe, as the "source pipe".

Figure 3:
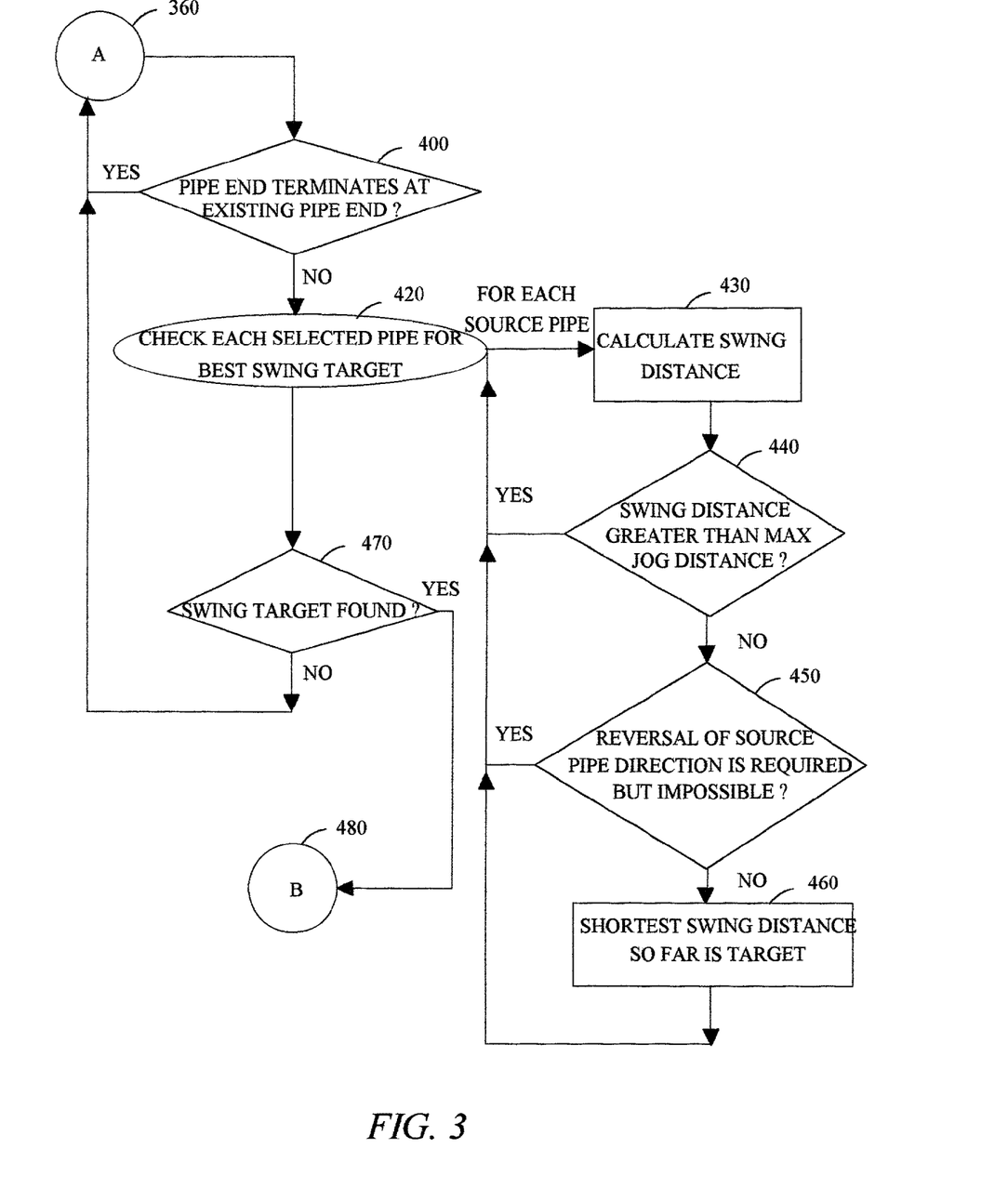

Turning now to FIG. 3, if the source pipe end already terminate, such as by a fitting, at an existing pipe end 400, the pipe end is ignored and processing continues to the next source pipe end 350. The next pipe end may be the opposite end of the current source pipe, an end of the next pipe among the specified pipes, or there may be no more specified pipe ends which remain to be processed 370.

The best suitable candidate among the specified pipes is determined to be the swing target 420. This step is performed iteratively upon every potential candidate. First, the swing distance is calculated 430. For example, as shown in FIG. 9, for pipe layout objects 62 and 64, existing in a parallel and collinear relationship 60, the swing distance 66 equals the distance from the source pipe 62 end 30, being processed, to the closest end 30 of the candidate pipe 64. At 90, for parallel pipes existing in a non-collinear relationship the swing distance 96 is calculated as the distance between dotted lines 98 which are computed rays extending lengthwise through the pipes 94 and 92 ends 30.

Figure 11:
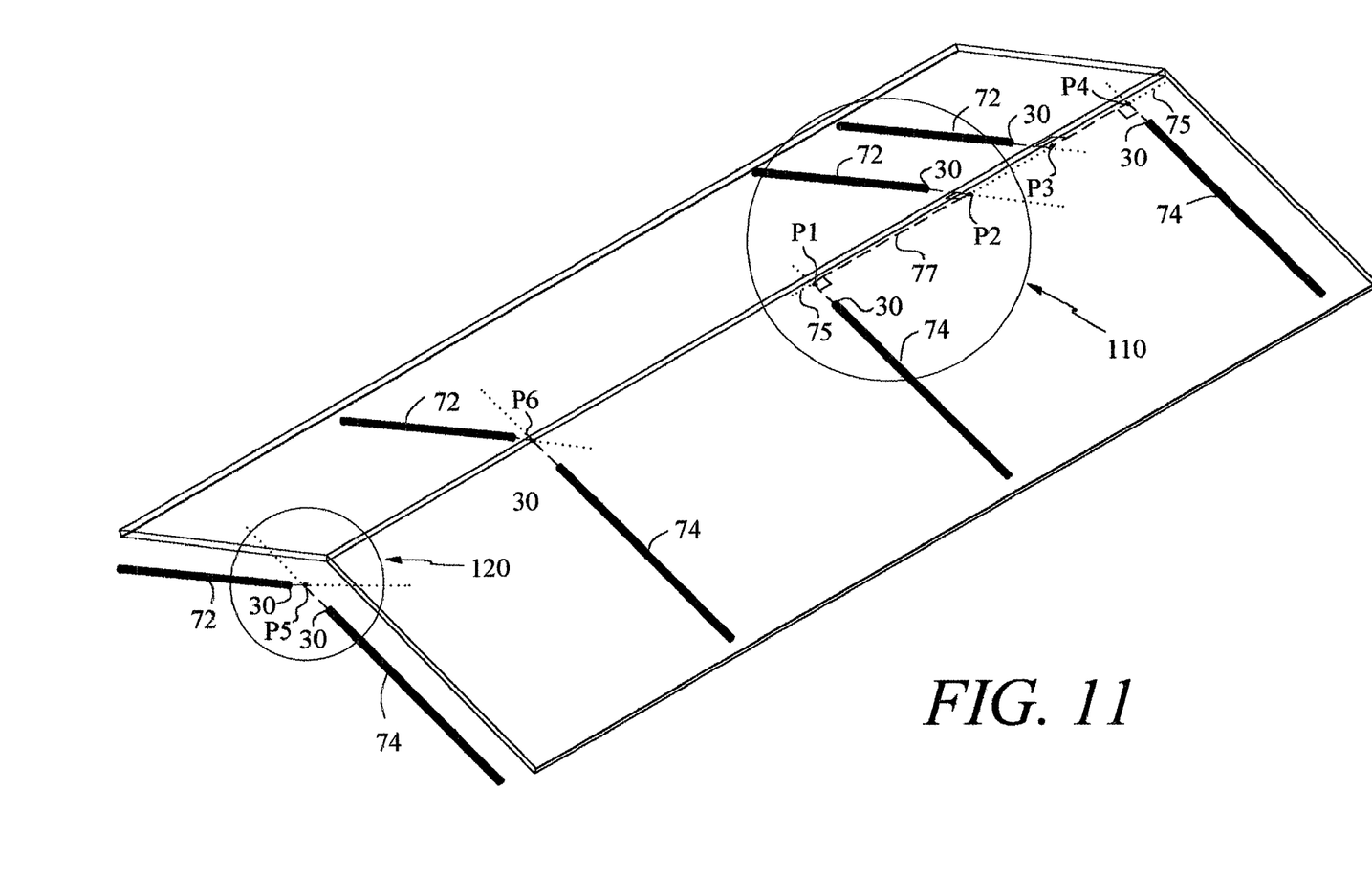
FIG. 11 is an illustration diagram showing a classic example of a display on a display unit of a sprinkler system pipe layout design in a case where the non-parallel sprinkler pipes are to be hung under a pitched roof and exist is the display in a non-parallel relationship.

As shown in FIG. 11, for source 72 and target pipes 74, existing in a non-parallel and non-collinear-relationship, a dotted line 75 is calculated that intersects extensions of both dotted lines formed by the pipes 74, 72 such that the intersection with each line forms a 90° angle, at P1 to P4.

There will be only one such line 75. The swing distance is the distance between the two intersection points P1 to P2 and P3 to P4. If the swing distance, such as P1 to P6 is greater than the maximum jog-over distance, set by the user, the candidate 74 is ignored and processing continues to the next potential candidate 74.

Referring once again to FIG. 3, the point to which the pipe end 30 must be extended is checked to determine if it requires a reversal of the direction of the pipe end 450. For example, in FIG. 10, if the swing points 76 are not on a ray A projected from the source pipes 72 ends 30, then a reverse of the pipes 72 end's 30 direction is required to reach the swing points 76. The source pipes 72 are tested to see whether reversal is possible under conditions that: (1) the source pipes 72 and the candidates 74 must not be parallel; and (2) there must already be pipes 77 connected to the ends 31 opposite source pipes 72 ends 30. If reversal of the source pipe's 72 direction is required but is not possible, the candidate 74 is ignored and processing continues to the next potential candidate. The candidate 74 that results in the shortest swing distance 460 is determined to be the swing target and the pipe 72 is reversed and connected consistent with the dashed line segments 73. Where the swing target 74 has been found, and the source pipe 72 direction has not been reversed, the computer will add up to three new pipe segments 73 to the existing pipes list (dashed lines in circle 110, FIG. 11).

Referring now to FIG. 9 and FIGS. 5 to 8 the operational steps for the addition of the new pipe segments to the existing pipe list are shown. In FIG. 9, where the source pipe 62 and candidate 64 are in the parallel collinear relationship 60, the closest end 30 of the swing target 64 to the pipe 62 end is determined 700, and the closest end 66 of the swing target 64 is then extended (dashed line) to the source pipe 62 end 30 where a straight fitting is created (step 710).

For parallel pipes, 92, 94, (step 550) an intersection point is calculated as that point 91 at which line 93, extends perpendicular to vectors 98, passing through both pipe lines 92 and 94, intersects the target pipe 94 end 30. A pipe segment 95 is created from the pipe end 30 to the intersection point 91 on the target pipe line 94, and a segment is created from the closest end 30 of the target pipe 94 to the intersection point 91.

Lastly, as exemplified in FIG. 11 at circle 110, for non-parallel pipes 72, 74, having a non-coplanar relationship in the existing layout drawing, a line 75 is calculated which intersects vectors passing through both lines formed by source pipes 72 and candidates 74 such that the intersections, at points P1 to P2, and P3 to P4 with each vector forms a 90 degree angle. The ends 30 of pipes 72 are extended (dashed line) to the intersection points P2 and P3 along the source pipes 72 calculated line (dotted). A pipe segment 77 is created between the two intersection points unless the two points P1 and P2 are at the same location. The closest end 30 of the target pipes 74 is extended to the intersection points P1 and P4 along the target pipe line.

The non-parallel pipes 72 and 74 may also be in a co-planar relationship as illustrated at circle 120. The intersection point P5 may not be at a point where extensions of pipe segments 72 and 74 meet at 90 degrees. In this instance, the intersecting line is the point P5 and with only one intersecting point P5, two segments (dashed lines) are created.

Figure 4:
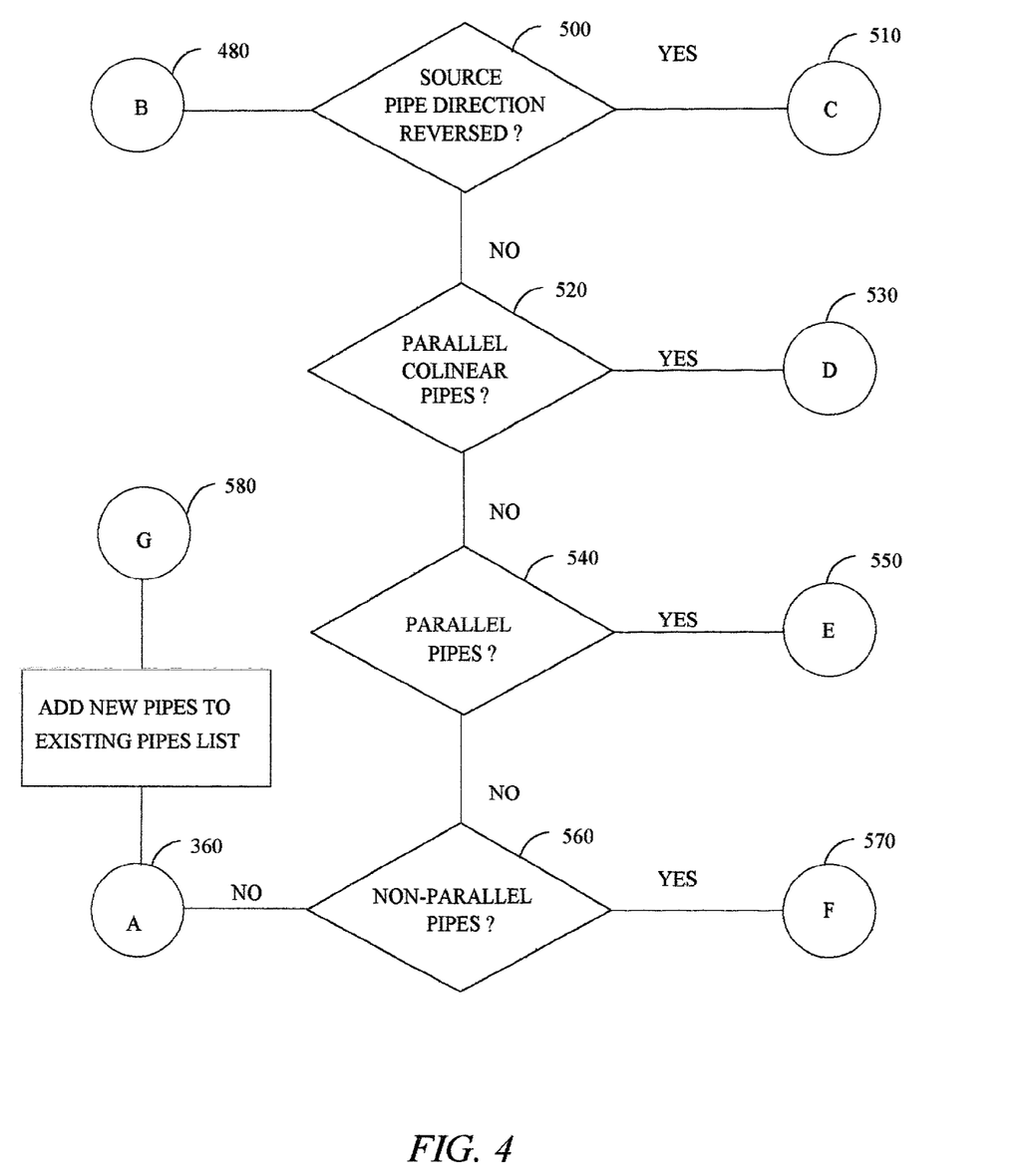
Figure 5:
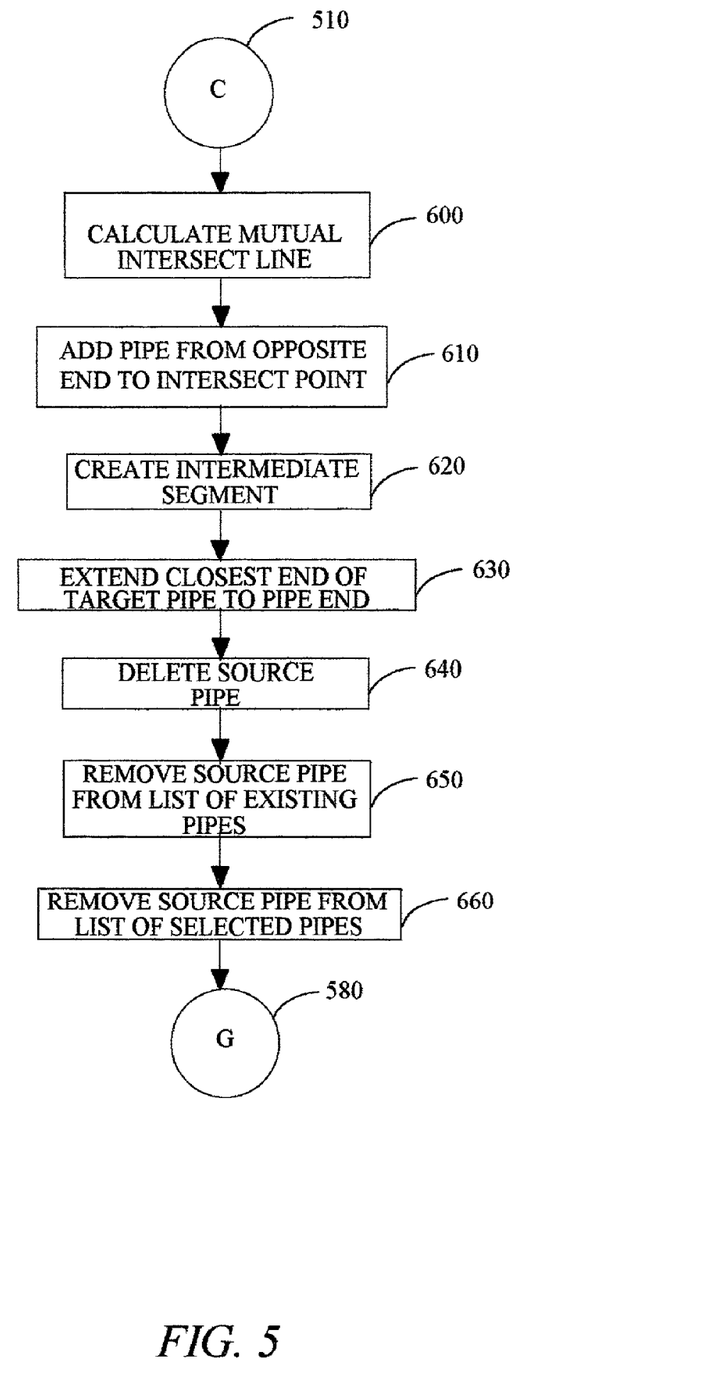
Figure 6:
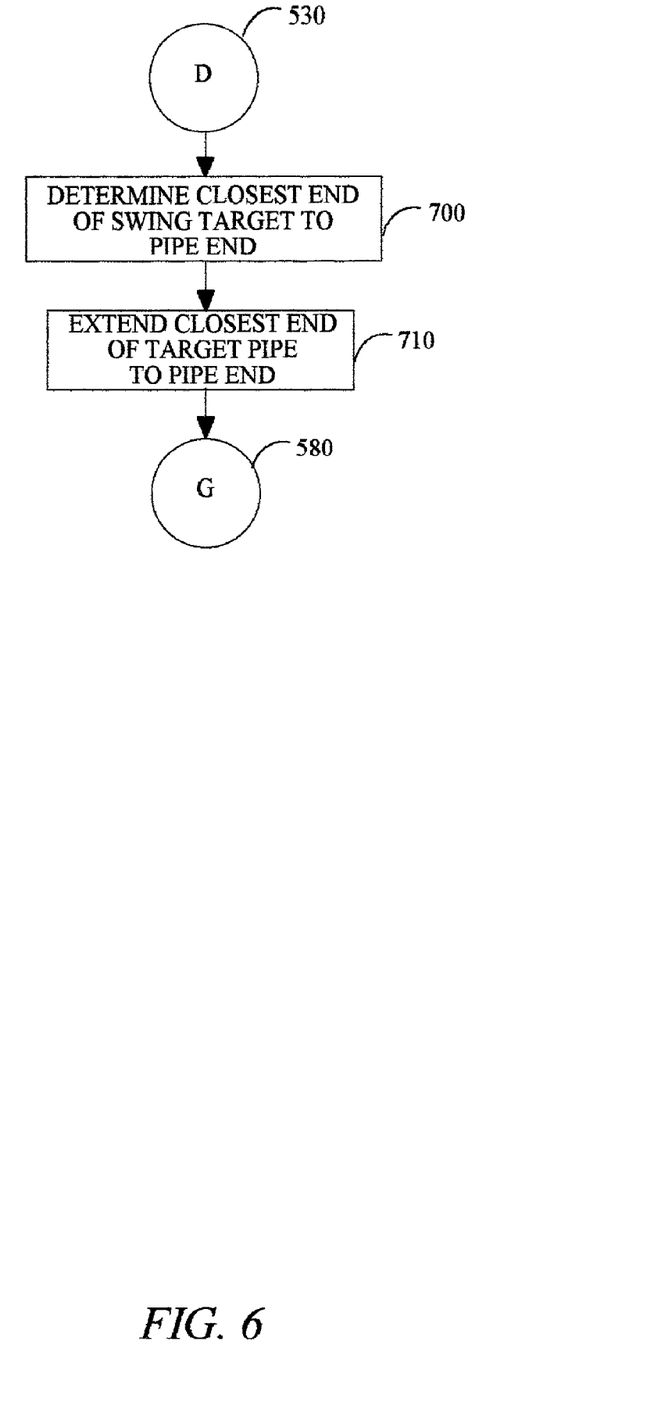
Figure 7:
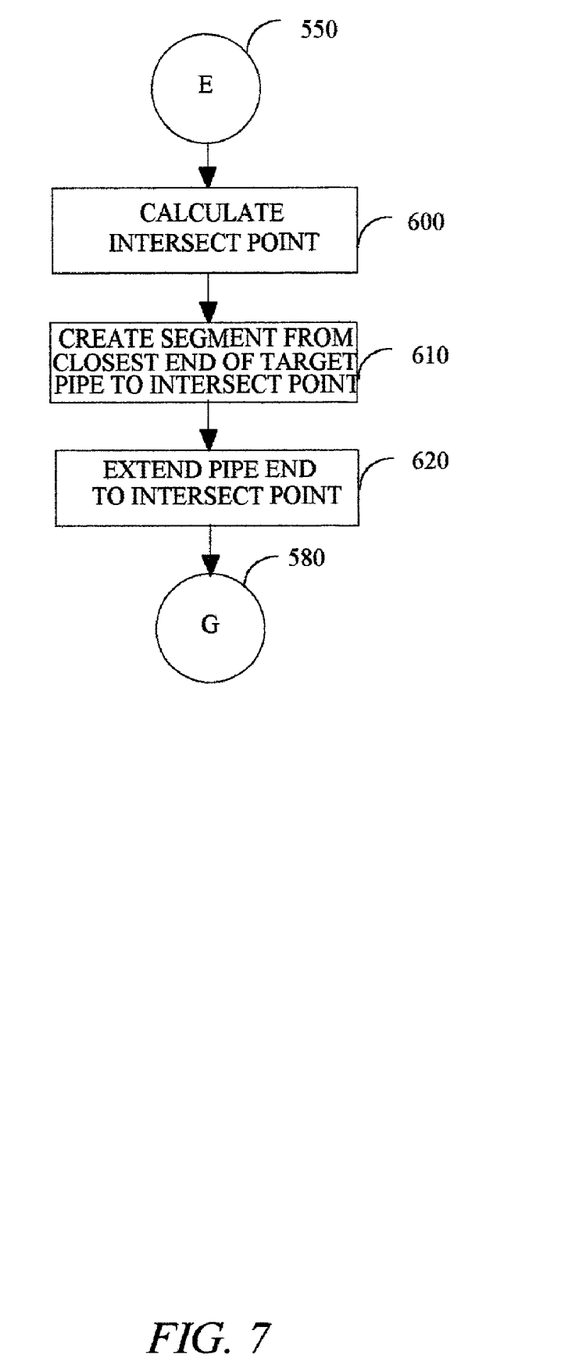
Figure 8:
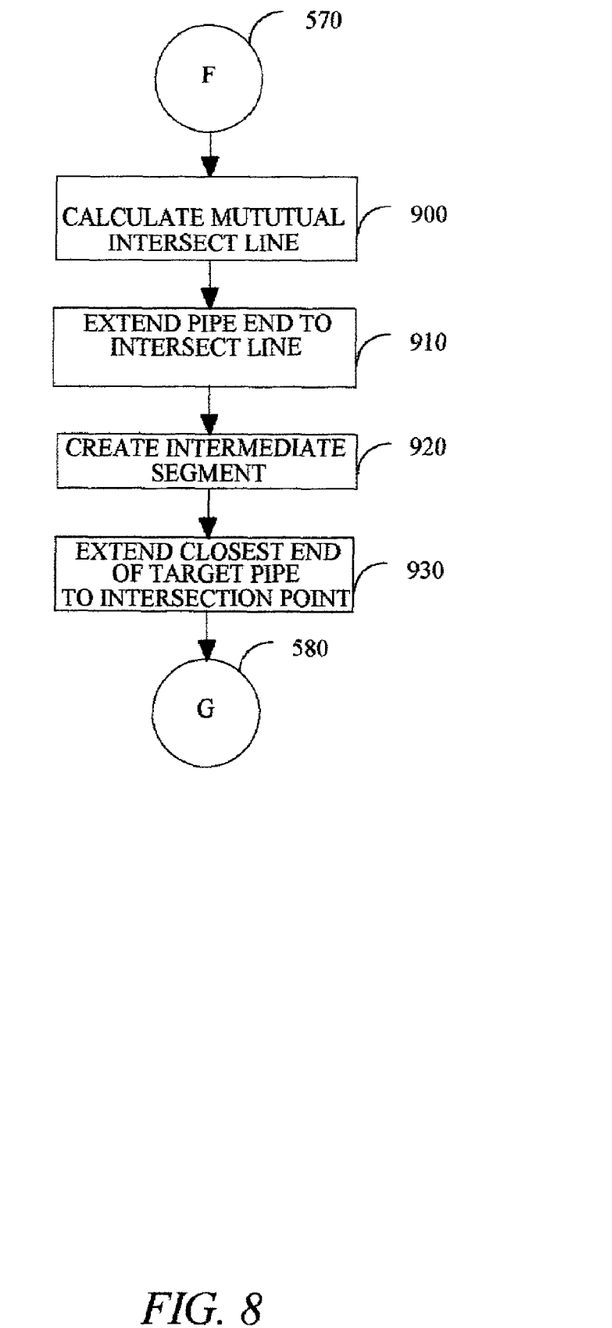
Figure 10:
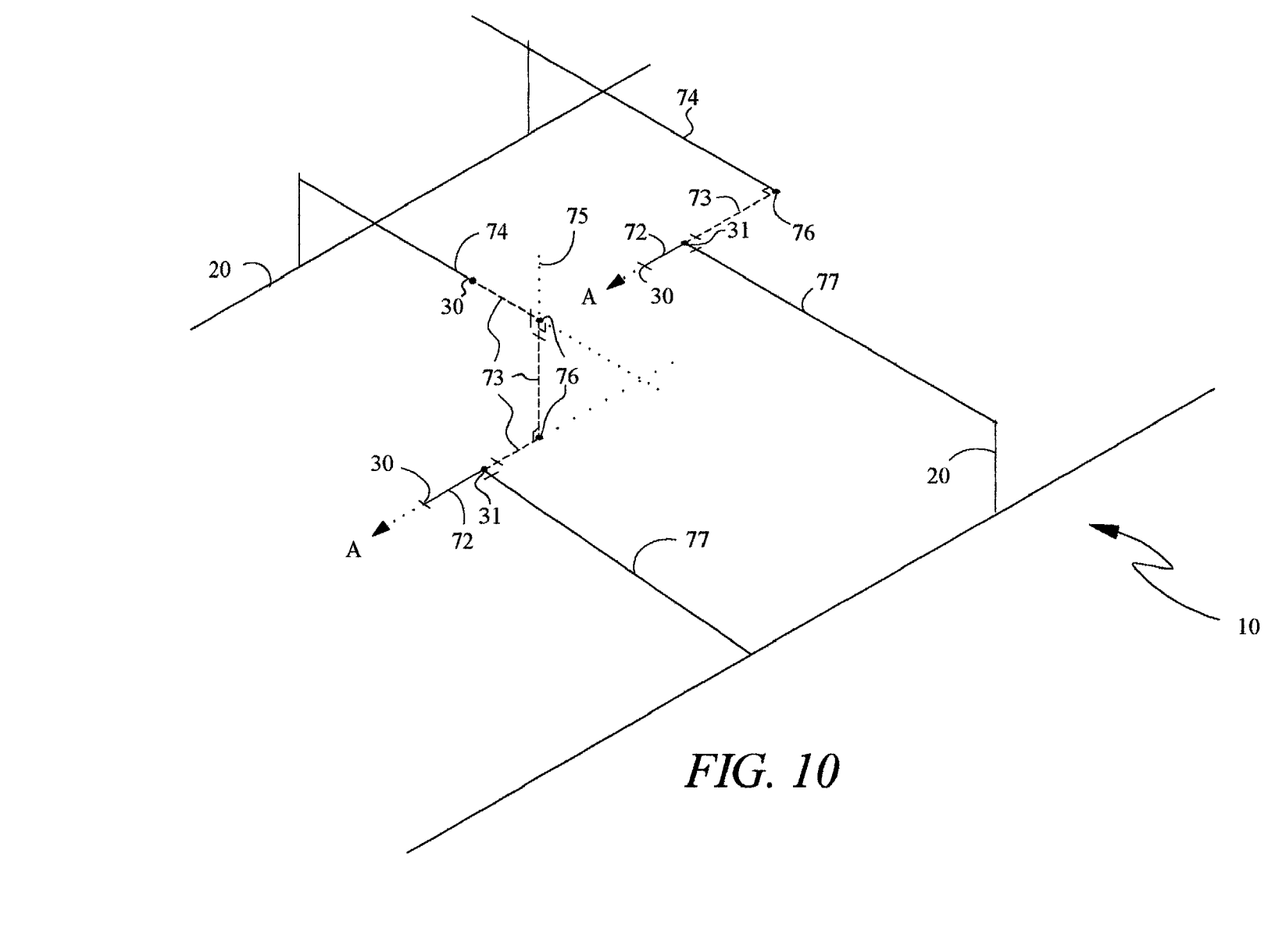
FIG. 10 is a diagram showing an example of a display on the display unit of a sprinkler system pipe layout design in a case where source sprinkler pipes can be reversed to form swing-joint intersections with target pipes.

As shown in FIGS. 5 and 10, the addition of the new pipes to the list 640 is slightly different where the source pipe's 72 direction opposite ray A must be reversed. The mutual intersect line 75 is first calculated 600. The swing-joint is constructed 610 from the opposite end 31 of the source pipe 72, rather than from the pipe end 30 being processed. The source pipe 72 is deleted 640 after the swing-joint is created 630. The source pipe 72 is removed from the list of existing pipes 650, and from the list of specified pipes. In FIG. 4, for each of the above examples, the newly created pipes 73 are then added 580 to the collection of existing pipes.

Referring once again to FIG. 2, the newly created pipes which have been added to the collection of existing pipes are added for analysis relative to the next specified pipe end to be processed 350. After all of the specified pipes have been processed 370, the pipe segments are consolidated together 380 where possible, including all pipes that were identified by the CAD operator and pipes that were added to create swing-joints. The consolidations results in one of the pipe segments being removed from the CAD drawing. The remaining pipe segment is extended to fill the space vacated by the pipe segment which has been deleted.

While the present invention has been illustrated and described with reference to particular structures and methods of fabrication, it will be apparent that other changes and modifications can be made therein within the scope of the present invention as defined by the appended claims.

I claim:

1. A method of creating layout objects displayed on a display device, the layout objects representing swing-joint intersections between sections of piping, the method comprising:
    selecting at least two pipe layout objects for swing joint interconnection;
    retrieving layout object data representing the selected at least two pipe layout objects;
    retrieving design reference data representing a maximum jog-over distance;
    selecting a first one of the at least two pipe layout objects, wherein the selected first pipe layout object has at least one non-terminated end;
    calculating a swing-distance between the selected first pipe layout object and each of the non-selected pipe layout objects;
    comparing each calculated swing-distance to the maximum jog-over distance to determine a group of target pipe layout objects;
    selecting one of the target pipe layout objects from the group of target pipe layout objects; and
    generating at least one swing joint layout object interconnecting the selected first pipe layout object and the selected target pipe layout object.

2. A method as defined in claim 1, further comprising storing layout object data representing the swing joint layout object.

3. A method as defined in claim 1, further comprising displaying image data representing the selected at least two pipe layout objects and the swing-joint layout object.

4. A method as defined in claim 1, wherein the layout object data further includes functional data representing a layout objects function.

5. A method as defined in claim 1, wherein selecting one of the target pipe layout objects further comprises rotating the selected one of the target pipe layout objects 180° so that its orientation is conducive to installation of a swing-joint.

6. A method as defined in claim 1, further comprising consolidating the selected at least two pipe layout objects and the generated at least one swing-joint layout object.

7. An apparatus for creating swing joint layout objects displayed on a display device, the apparatus comprising:

a memory for storing layout object data representing at least two pipe layout objects;

an input device for specifying a maximum jog-over distance;

a processor for executing machine readable instructions, wherein the instructions cause the processor to retrieve layout object data from a storage, select a first one of the at least two pipe layout objects, wherein the selected first pipe layout object has at least one non-terminated end, calculate a swing-distance between the selected first pipe layout object and each of the non-selected pipe layout objects, compare each calculated swing-distance to the maximum jog-over distance to determine a group of target pipe layout objects, select one of the target pipe layout objects from the group of target pipe layout objects, and generate at least one swing joint layout object interconnecting the selected first pipe layout object and the selected target pipe layout object; and a display device for displaying image data representing the selected first pipe layout object and the selected target pipe layout object.

8. An apparatus according to claim 7, wherein the instructions further cause the processor to select one of the target pipe layout objects by rotating the selected one of the target pipe layout objects 180° so that its orientation is conducive to installation of a swing-joint.

9. An apparatus according to claim 8, wherein the instructions further cause the processor to consolidate the selected at least two pipe layout objects and the generated at least one swing joint layout object.

* * * * *